United States Patent [19]

Kacarov et al.

[11] Patent Number: 5,529,688
[45] Date of Patent: Jun. 25, 1996

[54] DEVICE FOR MAGNETIC TREATMENT OF LIQUIDS

[75] Inventors: Zhivko I. Kacarov; Belcho I. Belchev, both of Sofia, Bulgaria

[73] Assignee: SD MTM Kacarov & Co., Sofia, Bulgaria

[21] Appl. No.: 318,623

[22] PCT Filed: Feb. 3, 1993

[86] PCT No.: PCT/BG93/00005

§ 371 Date: Oct. 31, 1994

§ 102(e) Date: Oct. 31, 1994

[87] PCT Pub. No.: WO94/18124

PCT Pub. Date: Aug. 18, 1994

[51] Int. Cl.$^6$ ..................................................... C02F 1/48
[52] U.S. Cl. ............................................ 210/222; 210/695
[58] Field of Search ................................ 210/222, 695; 123/538

[56] References Cited

U.S. PATENT DOCUMENTS

| | | | |
|---|---|---|---|
| 4,422,934 | 12/1983 | Debney et al. | 210/222 |
| 4,659,479 | 4/1987 | Stickler et al. | 210/222 |
| 4,892,655 | 1/1990 | Makovec | 210/222 |

*Primary Examiner*—Matthew O. Savage
*Attorney, Agent, or Firm*—Herbert Dubno

[57] ABSTRACT

The device for activation of water, water systems, fuels and oils includes an external casing of nonmagnetic material into which is inserted a hollow cylindrical body of nonmagnetic material over which is wound up the electromagnetizing coil, the cavity of the body receives the core of nonmagnetic material formed by the elements arranged along the core axis consecutively rotated at an equal angle in the same direction to form two stepped screw-shaped channels with the inside surface of the hollow cylindrical body.

3 Claims, 3 Drawing Sheets

DEVICE FOR MAGNETIC TREATMENT OF LIQUIDS

FIELD OF THE INVENTION

This is a national phase application of PCT/BG 93/00005 filed 3 Feb. 1993 and based, in turn, upon Bulgarian application filed 3 Oct. 1993 under the International Convention.

The present invention relates to a device for magnetic treatment of liquids such as water, water systems oils and fuels, which are used in mechanical engineering, the food industry, energy production, the building, transport, medicine and in the household.

BACKGROUND OF THE INVENTION

A device for magnetic treatment of water is known as comprising a cylindrical two-shoulder body of nonmagnetic material. The shoulder with a smaller diameter is hollow and longer. Into its cavity is pressed the magnetizing coil. The second shoulder with a greater diameter possesses a circular channel (cannelure) from the side of the first shoulder with the smaller diameter. Over the first shoulder with the smaller diameter is laid an insert of nonmagnetic material whose outside diameter is equal to the outside diameter of the second shoulder and whose length is smaller than the length of the shoulder with the smaller diameter. The insert with a longitudinal groove is clamped to the two-shoulder body by means of cup-shaped cap. In the shoulder with the greater diameter and in the cup-shaped cap are bored apertures for the inlet and the outlet of the liquid.

The disadvantages of the above described device are the relatively low effect of the magnetic treatment and the increased hydraulic resistance.

Another device for the magnetic treatment of lubricating and cooling liquids is known consisting of a casing of nonmagnetic material, inside of which is disposed a hollow cylindrical body of nonmagnetic material, over which body is wound the electromagnetizing coil. In the cavity of the body is placed a cylindrical core of nonmagnetic material having a screw-shaped groove. The cylindrical body is closed by caps with apertures for the inlet and the outlet of the liquid.

The disadvantages of this device are the relatively low magnetic treatment effect and the increased hydraulic resistance.

OBJECT OF THE INVENTION

The object of the present invention is to provide a device for magnetic treatment of liquids characterized by a high effect of the treatment and low hydraulic resistance.

SUMMARY OF THE INVENTION

This object is achieved with the device for magnetic treatment of liquids according to the invention which comprises a casing of nonmagnetic material, inside of which is disposed a hollow cylindrical body of nonmagnetic material. Over the body is wound the electromagnetizing coil and are set up the caps with apertures. Into the cavity of the body is inserted the core of nonmagnetic material. The core is constituted of a compact cylinder divided by imaginary transversal planes of disks forming the different elements. Every element is obtained by cutting from each disk between two adjacent transversal planes two equal segments with parallel chords. The elements are arranged along the axis of the core, consecutively rotated one towards the next one at an equal angle in the same direction.

According to a preferred embodiment, the angle of rotation of the elements ranges from 30° to 60°, and the number of the elements ranges from 4 to 8.

Between the internal fronts of the caps and the opposite fronts of the both final elements there are spacers.

It is possible to have the spacers shaped like hoods around the frontal surfaces of the both final elements.

The core may be executed as a monolithic body or assembled from separate elements.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
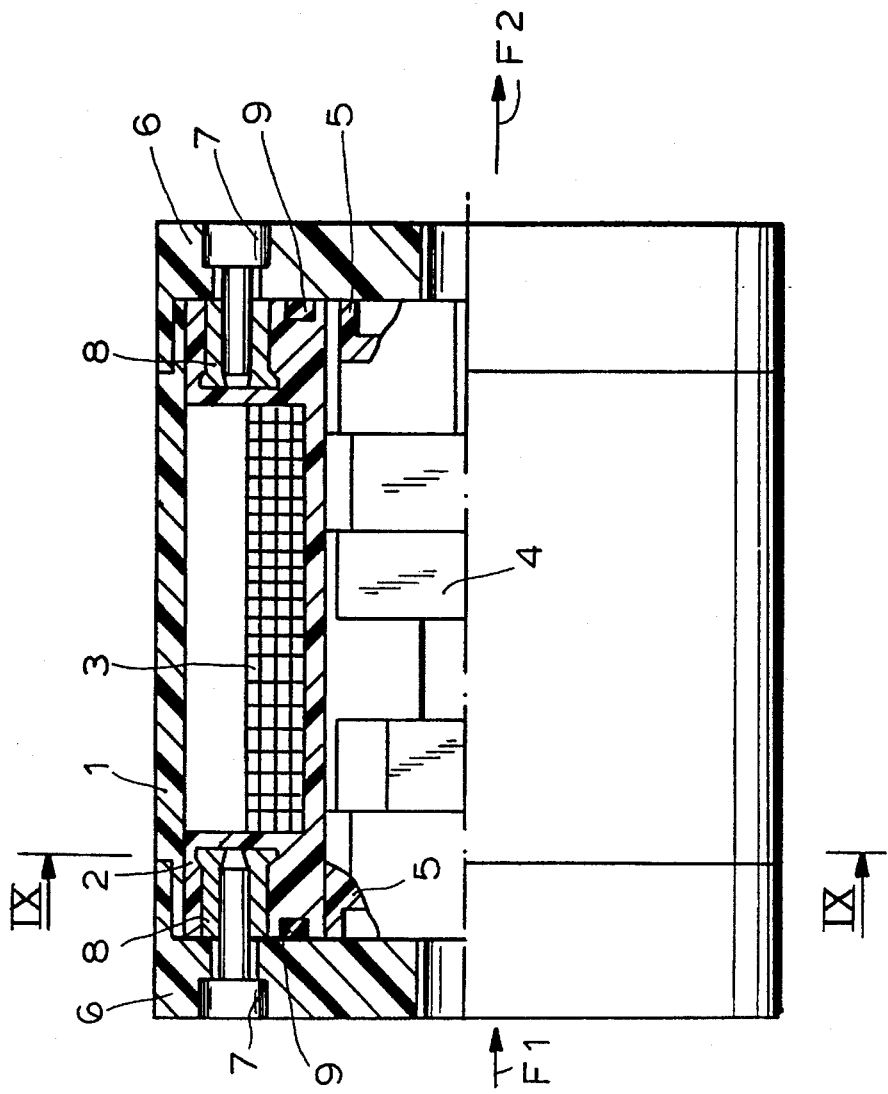
FIG. 1 is a longitudinal sectional view of the device.
Figure 8:
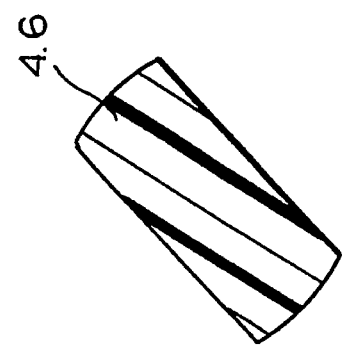
FIGS. 4, 5, 6, 7 and 8 are cross-sectional views of the second, third, fourth, fifth and the sixth elements of the core according to FIG. 2.

According to FIG. 1 the device consists of a casing 1 of nonmagnetic material, into which is disposed the hollow cylindrical body 2 of nonmagnetic material, over which body is wound the electromagnetizing coil 3. Into the cavity of the body 2 is inserted the core 4 and the spacers 5 of nonmagnetic material. The hollow cylindrical body 2 is closed with the caps 6 tightened by means of the screws 7 to the threaded bushs 8 pressed in the hollow cylindrical body 2.

Between the hollow cylindrical body 2 and the caps 6 are laid the sealing rings 9.

Figure 2:
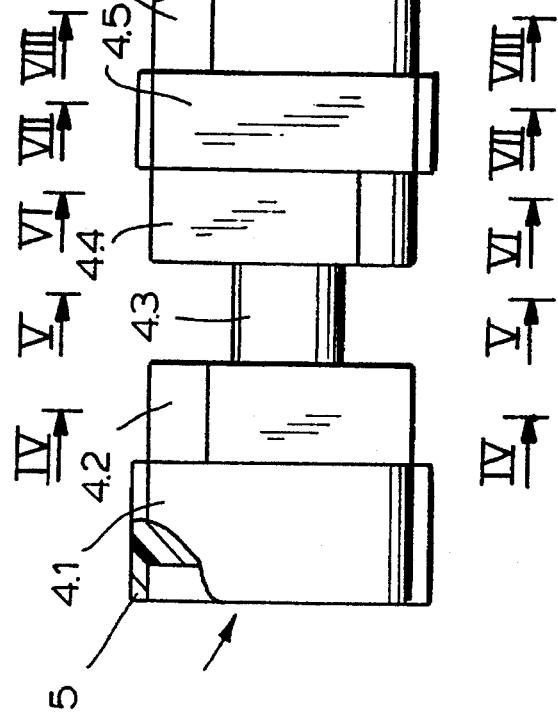
FIG. 2 is a view of the core according to FIG. 1 with a partial cross-section.
Figure 7:
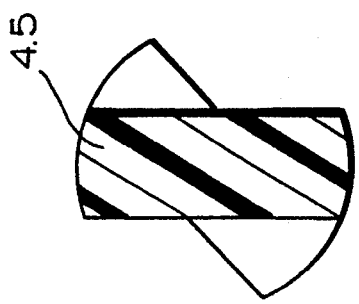
Figure 6:
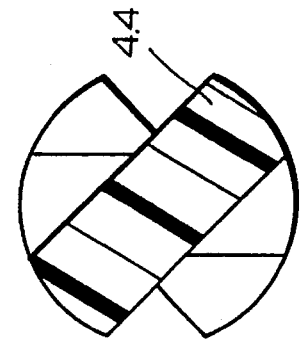
Figure 5:
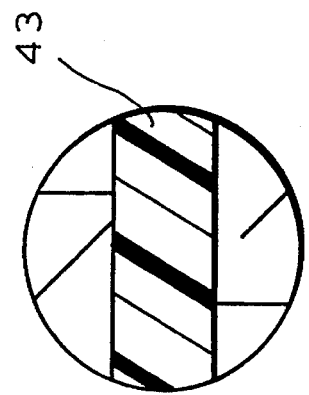
Figure 4:
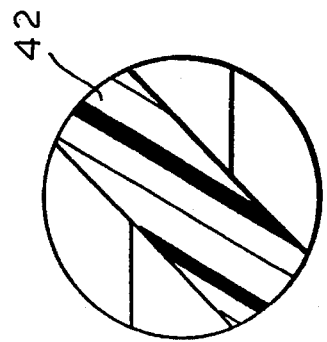

The core 4 according to FIG. 2 is constituted of a compact cylinder, divided by imaginary transversal planes of six disks forming the six elements 4.1, 4.2, 4.3, 4.4, 4.5, 4.6. Each element from 4.1 to 4.6 is obtained by cutting from each disk between two adjacent transversal planes two equal segments with parallel chords. The elements from 4.1 to 4.6 are arranged along the axis of the core 4, consecutively rotated one towards the next one at an equal angle in the same direction, in this instance clockwise.

Figure 3:
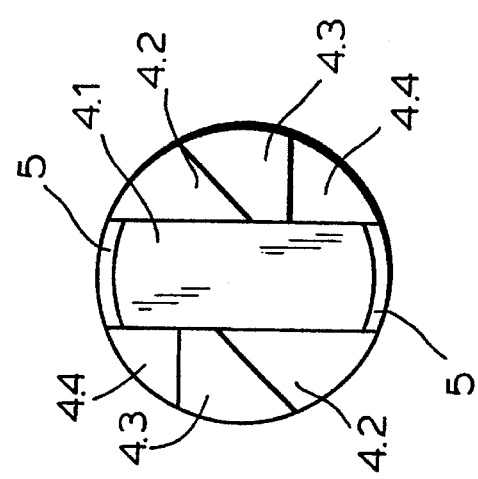
FIG. 3 is a view of the core from the side of the end element according to FIG. 2.

Over the frontal surfaces of the both final elements 4.1 and 4.6, from the side of the caps 6, are shaped the spacers 5 like hoods (FIG. 3).

In FIGS. 4, 5, 6, 7 and 8 are shown the cross-sections of the elements 4.2, 4.3, 4.4, 4.5, 4.6 respectively along A—A, B—B, C—C, D—D and E—E, where every next element from 4.2 to 4.6 is revolved at an angle of 45° towards the foregoing one.

Figure 9:
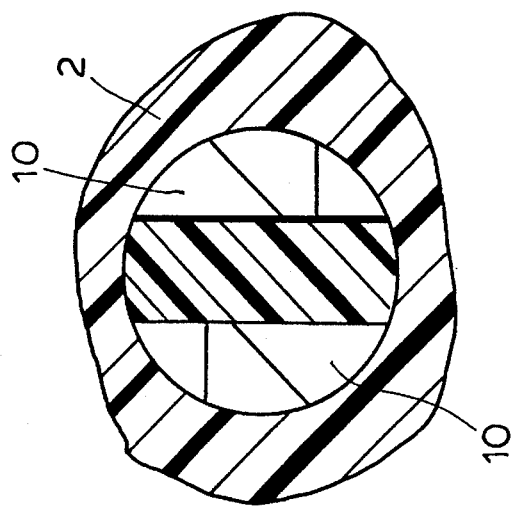
FIG. 9 is a partial cross-sectional view of the device across the end element of the core according to FIG. 1.

The core 4 in the hollow cylindrical body 2 forms two screw-shaped stepped channels 10 limited by the surfaces of the elements from 4.1 to 4.6 and the inside surface of the hollow cylindrical body 2 shown on the FIG. 9 representing a partial section along G—G of the device according to FIG. 1.

The spacers 5 with the hoods keep the space between the frontal surfaces of the both final elements 4.1 and 4.6 and the apertures of the caps 6.

The device according to the invention operates as follows:

The liquid enters through the inlet port of the device in a direction shown by the arrow F1 on the FIG. 1 and is directed to the both screw-shaped stepped channels 10. On its way the liquid runs into the frontal surfaces of the elements of the core 4, deflecting, turbulenting and at the same time is being subjected to the action of the alternating electromagnetic field created by the coil 3. Leaving the screw-shaped stepped channels 10 the liquid flows through the outlet port of the device in the direction of the arrow F2.

The same effect of magnetic treatment of the liquid is obtained also in the opposite flow direction of the liquid.

The efficiency of the device according to the invention in comparison with the known devices is estimated comparing the results of the magnetic treatment of a 5% emulsion of the products: emulsol IBX-2 (Company Standard 0282143-88) and mineral oil AN15 (Bulgarian State Standard 529-86).

The estimation criterion for the effect of the magnetic treatment was the surface tension on the interface liquid-air because it exerts influence upon the important technological characteristics of the liquids such as: the solubility, humidification, washing effect and the cooling capability.

The results are shown respectively on the tables 1,2.

TABLE 1

| Device | Decrease of the surface tension in % for the emulsion IBX-2 at a speed V m/s | | | | | | | |
|---|---|---|---|---|---|---|---|---|
| | 0.03 | 0.07 | 0.15 | 0.35 | 0.60 | 0.95 | 1.2 | 2.4 |
| First known device | 2.4 | 2.4 | 2.8 | 3.0 | 3.1 | 3.0 | 2.9 | 3.0 |
| Second known device | 2.4 | 2.6 | 3.0 | 3.0 | 3.0 | 3.0 | 3.1 | 3.0 |
| Device according to the invention | 3.0 | 3.0 | 3.4 | 3.6 | 3.8 | 3.8 | 3.9 | 3.8 |

TABLE 2

| Device | Decrease of the surface tension in % for mineral oil AN15 at a speed V m/s | | | | | | | |
|---|---|---|---|---|---|---|---|---|
| | 0.15 | 0.35 | 0.60 | 0.95 | 1.20 | 1.80 | 2.40 | 3.0 |
| First known device | 0.5 | 0.7 | 1.2 | 1.3 | 1.5 | 1.9 | 2.5 | 2.8 |
| Second known device | 0.8 | 1.2 | 1.6 | 2.0 | 2.5 | 2.5 | 2.8 | 2.8 |
| Device according to the invention | 2.2 | 2.8 | 3.0 | 3.2 | 3.4 | 3.3 | 3.5 | 3.5 |

The treated liquid flows through two screw-shaped stepped channels 10, with a gentle slope of the screw-shaped line and a great effective section enabling a low hydraulic resistance.

We claim:

1. A device for magnetically treating water, said device comprising:

a nonmagnetic casing extending along a longitudinal axis, said casing having first and second open ends;

a nonmagnetic hollow cylindrical body positioned within said casing and being centered on said axis and formed with outer and inner peripheral surfaces, said body having first and second open ends;

first and second end caps mounted to the first and second open ends of said casing and said body, respectively, wherein said first end cap includes an inlet opening communicating with the first open end of said body, and said second end cap includes an outlet opening communicating with the second end of said body;

a longitudinal electromagnetic coil wound over said outer peripheral surface of said body and positioned in said casing;

an elongated nonmagnetic core having opposite ends, said core being received in said hollow body and coaxial therewith and communicating with said inlet and outlet, said core being provided with a plurality of disk-shaped elements coaxially mounted within said body and longitudinally subdividing said hollow body into a row of successive zones extending transversely to said longitudinal axis, wherein said plurality of disk-shaped elements comprise a pair of end disks defining the opposite ends of said core, each of said elements being formed with a respective pair of opposite planar edges of equal length defining parallel chords, wherein the cords of each said element are rotated with respect to the cords of an adjacent said element at an angle to form in each zone a respective pair of diametrically opposite chambers communicating with one another and with chambers of the adjacent zones, said chambers of the successive zones defining a pair of opposite screw-shaped stepped channels for the flow of water traversing said zones;

a pair of axially spaced apart spacers coaxial with said hollow body on said inner surface of the hollow body, wherein one of said spacers is abuttingly mounted between said first end cap and one of said end disks, and the other spacer is abuttingly mounted between the second end cap and the other of said end disks.

2. The device defined in claim 1 wherein said angle ranges from 30° to 60°.

3. The device defined in claim 1 wherein said core is monolithic.

\* \* \* \* \*